(12) United States Patent  (10) Patent No.: US 7,729,437 B2
Jeong et al.  (45) Date of Patent: Jun. 1, 2010

(54) METHOD AND APPARATUS FOR SPACE-TIME CODING USING LIFTING LOW DENSITY PARITY CHECK CODES IN A WIRELESS COMMUNICATION SYSTEM

(75) Inventors: Hong-Sil Jeong, Incheon (KR); Jae-Yoel Kim, Gunpo-si (KR); Chan-Byoung Chae, Seoul (KR)

(73) Assignee: Samsung Electronics Co., Ltd (KR)

( * ) Notice: Subject to any disclaimer, the term of this patent is extended or adjusted under 35 U.S.C. 154(b) by 1631 days.

(21) Appl. No.: 10/964,275

(22) Filed: Oct. 13, 2004

(65) Prior Publication Data

US 2005/0078765 A1  Apr. 14, 2005

(30) Foreign Application Priority Data

Oct. 13, 2003  (KR) .................. 10-2003-0070997

(51) Int. Cl.
 *H04B 7/02* (2006.01)
(52) U.S. Cl. .......................... 375/267; 706/15
(58) Field of Classification Search .............. 341/50; 375/267; 706/15; 714/801
 See application file for complete search history.

(56) References Cited

U.S. PATENT DOCUMENTS

| 6,567,465 | B2 | 5/2003 | Goldstein et al. |
| 6,600,796 | B1 * | 7/2003 | Hassibi .................... 375/347 |
| 6,633,856 | B2 * | 10/2003 | Richardson et al. ........... 706/15 |
| 7,000,168 | B2 * | 2/2006 | Kurtas et al. ................. 714/755 |
| 7,013,116 | B2 * | 3/2006 | Ashikhmin et al. ......... 455/214 |
| 7,154,936 | B2 * | 12/2006 | Bjerke et al. ................ 375/148 |
| 2002/0059552 | A1 * | 5/2002 | Murillo ...................... 714/800 |
| 2002/0154712 | A1 * | 10/2002 | Cideciyan et al. ........... 375/341 |
| 2003/0104788 | A1 | 6/2003 | Kim |
| 2003/0235166 | A1 * | 12/2003 | Son et al. .................... 370/334 |
| 2004/0028002 | A1 | 2/2004 | Eroz et al. |
| 2004/0093554 | A1 * | 5/2004 | Hung ......................... 714/801 |
| 2005/0258987 | A1 * | 11/2005 | Richardson ................. 341/50 |
| 2006/0242093 | A1 * | 10/2006 | Richardson et al. .......... 706/15 |
| 2008/0095121 | A1 * | 4/2008 | Shattil ........................ 370/335 |

OTHER PUBLICATIONS

MacKay et al., "Near Shannon Limit Performance of Low Density Parity Check Codes", Electronic Letters, Aug. 29, 1996, vol. 32, No. 18, pp. 1645-1646.

* cited by examiner

*Primary Examiner*—David C Payne
*Assistant Examiner*—Leon-Viet Q Nguyen
(74) *Attorney, Agent, or Firm*—The Farrell Law Firm, LLP

(57) ABSTRACT

A mobile communication system and method for transmitting signals through a plurality of transmission antennas by space-time coding the signals. The signals are transmitted using a low density parity check code. A lifting low density parity check matrix is formed by expanding values of elements in a low density parity check matrix with a sub-matrix corresponding to a number of the transmission antennas. The signals to be transmitted are coded using the lifting low density parity check matrix. Thereafter, the coded signals are serial/parallel converted and transmitted through the transmission antennas.

30 Claims, 16 Drawing Sheets

$$H = \begin{bmatrix} 1 & 0 & 1 & 0 & 1 & 0 & 1 & 0 \\ 1 & 0 & 0 & 1 & 0 & 1 & 0 & 1 \\ 0 & 1 & 1 & 0 & 0 & 1 & 1 & 0 \\ 0 & 1 & 0 & 1 & 1 & 0 & 0 & 1 \end{bmatrix}$$

FIG.4

(PRIOR ART)

METHOD AND APPARATUS FOR SPACE-TIME CODING USING LIFTING LOW DENSITY PARITY CHECK CODES IN A WIRELESS COMMUNICATION SYSTEM

PRIORITY

This application claims priority to an application entitled "Method and Apparatus For Space-Time Coding Using Lifting Low Density Parity Check Codes In A Wireless Communication System" filed with the Korean Intellectual Property Office on Oct. 13, 2003 and assigned Serial No. 2003-70997, the contents of which are incorporated herein by reference.

BACKGROUND OF THE INVENTION

1. Field of the Invention

The present invention relates generally to an encoder/decoder of a wireless communication system using a plurality of antennas, and more particularly to a method and an apparatus for space-time coding/decoding using low density parity check codes.

2. Description of the Related Art

According to a space-time coding technique, signals output through a coding scheme are transmitted through a plurality of transmission antennas in such a manner that the coding scheme used in a time region can be also embodied in a spatial area, thereby achieving a low error rate.

FIG. 1 is a view illustrating a transmitter/receiver utilizing a space-time scheme. Referring to FIG. 1, the transmitter/receiver includes a space-time encoder 100, a space-time decoder 102, a plurality of transmission antennas 110 to 114 for transmitting signals output from the space-time encoder 100, and a plurality of reception antennas 120 to 124 for receiving signals output from the transmission antennas 110 to 114. The number of the transmission antennas 110 to 114 can be different from the number of the reception antennas 120 to 124.

The space-time encoder 100 codes input signals (input data) according to a predetermined coding rate. If the number of input data is k and the number of data output from the space-time encoder 100 is N, the coding rate of the space-time encoder 100 is k/N.

The transmission antennas 110 to 114 sequentially transmit symbols output from the space-time encoder 100. If symbols are transmitted through $N_T$ transmission antennas, the coding rate of the space-time encoder 100 is $$N_T \frac{k}{N}.$$

Each of the reception antennas 120 to 124 receives symbols transmitted through the transmission antennas 110 to 114. The first reception antenna 120 receives symbols transmitted through the first to $N_T$ transmission antennas 110 to 114. The second reception antenna 122 receives symbols transmitted through the first to $N_T$ transmission antennas 110 to 114. The $N_R$ reception antenna 124 receives symbols transmitted through the first to $N_T$ transmission antennas 110 to 114.

The space-time decoder 102 decodes symbols received through the reception antennas 120 to 124 according to a predetermined decoding rate. The decoding rate of the space-time decoder 102 is determined according to the coding rate of the space-time encoder 100. That is, if the coding rate of the space-time encoder 100 is k/N, the decoding rate of the space-time decoder 102 is N/k.

The space-time decoder 102 searches signals transmitted from the transmission antennas 110 to 114 by decoding received symbols. The space-time encoder 100 will be described in more detail herein below.

FIG. 2 is a view illustrating a conventional layered space-time encoder. The term "layered" signifies that channel coded data is transmitted through each transmission antenna according to a predetermined scheme.

Referring to FIG. 2, a channel encoder used in the layered space-time encoder utilizes a predetermined channel coding scheme. A coding rate of the layered space-time encoder is $N_T \times R$, wherein R is a coding rate of a channel encoder and $N_T$ is a number of antennas. The layered space-time encoder includes a channel encoder 200, a serial/parallel converter 202 for converting serial signals into parallel signals, a plurality of antenna interleavers 204 to 206, signal mapping units 208 to 210 used for each antenna, and multiple antennas 212 to 214. In FIG. 2, $\Pi_i$ is an $i^{th}$ antenna interleaver. The number of the antenna interleavers 204 to 206 and signal mapping units 208 to 210 is determined according to the number of multiple antennas 212 to 214.

Input data is coded through the channel encoder 200 in order to produce a signal having high reliability. Output data of the cannel encoder 200 passes through the serial/parallel converter 202 in order to be transmitted to $N_T$ antennas. Output data of the serial/parallel converter 202 is input into antenna interleavers 204 to 206, which sequentially interleave input data.

In addition, output data of the antenna interleavers 204 to 206 is mapped into desired signals by means of signal mapping units 208 to 210, before the output data is transmitted to the transmission antennas. The signal mapping units 208 to 210 determine input bit symbols as signals to be transmitted through the transmission antennas based on a constellation corresponding to a set of k bits.

Accordingly, the constellation may vary depending on a size n of, i.e., the number of, input bits. For example, if a value of n is 1, the constellation can be embodied through a BPSK (binary phase shift keying) scheme in which a phase of a signal is converted corresponding to a transmission code using a carrier having constant amplitude and frequency. If a value of n is 2, the constellation can be embodied through a QPSK (quadrature phase shift keying) scheme. Further, if a value of n is 3, the constellation can be embodied through an 8 QAM (quadrature amplitude modulation) scheme.

FIG. 3 is a view illustrating a conventional layered space-time decoder. More specifically, the space-time decoder illustrated in FIG. 3 is called a "layered space-time decoder" corresponding to the layered space-time encoder illustrated in FIG. 2.

Referring to FIG. 3, a frame data array transmitted through a plurality of transmission antennas is received in a predetermined reception antenna. If three reception antennas are provided, all of three reception antennas may receive the frame data array transmitted through three transmission antennas. The layered space-time decoder includes $N_R$ reception antennas 300 to 302, a detector 304, a decoder 312, $N_R$ antenna de-interleavers 306 to 308, $N_R$ antenna interleavers 316 to 318, a parallel/serial converter 310, and a serial/parallel converter 314.

Each of $N_R$ reception antennas 300 to 302 receives signals transmitted from each of transmission antennas. Data received in the reception antennas 300 to 302 is detected by the detector 304, and a transmission signal for each transmission antenna is detected. Output data of the detector 304 is input into antenna de-interleavers 306 to 308 corresponding to antenna interleavers 204 to 206 of the layered space-time encoder. That is, antenna interleaved data of the layered space-time encoder is de-interleaved to obtain original data.

Output data of the antenna de-interleaver is input into the parallel/serial converter 310, which converts parallel data into serial data, such that the output data is converted into serial data. In addition, output data of the parallel/serial converter 310 is input into the decoder 312. The decoder 312 is corresponding to the encoder of the layered space-time encoder and is used to reliably restore the signal.

Output data of the decoder 312 is identical to signals, which have not been decoded in the transmitter, if there is no error caused by channel environment. However, if the error occurs due to the channel environment, an iterative decoding is performed in order to precisely decode the reception signal.

Accordingly, output data of the decoder 312 passes through the serial/parallel converter 314, which converts serial data into parallel data, and is input into antenna interleavers 316 to 318. Output data of the antenna interleaver is again input into the detector and an iterative decoding is performed. The iterative decoding may improve reliability of restored data.

If the signal is reliably restored in the decoder 312 through the iterative decoding, an output of the decoder 312 is determined as a reception signal.

An object of the next generation wireless mobile communication system is to provide a multi-media service using a ground communication network and a satellite communication network. In order to provide the multi-media service, a high transmission rate and a low error rate are required. Therefore, in order to continuously transmit data with a high quality and a high reliability in an inferior transmission environment, an efficient channel coding technique must be used in the space-time coding.

The channel coding technique may vary according to the property of the channel. For example, an error-correcting code is used for the channel coding technique. An object of the error-correcting code is to obtain reliable communication under inferior channel environment. That is, data is coded using a channel code before data is transmitted through the channel, and then, information identical to original information is extracted from a channel output at a reception terminal.

A basic characteristic of such a system is based on Shannon's channel coding theory. According to Shannon's channel coding theory, if an optimal coding is performed with regard to information, there is a limitation to reduce an error occurring in a channel having noise without causing loss of an information transmission rate. Such a coding theory has been developed for several decades.

Among concatenated codes using convolutional codes, turbo codes using an iterative decoding technique are provided for a high-reliable channel coding technique for $3^{rd}$ generation wireless communication IMT-2000, which provides voice and low-speed multimedia services of several hundreds Kbps to few Mbps. The turbo codes, which were presented in 1993, may perform the coding operation by using parallel concatenated RSC (Recursive systematic convolutional) codes and perform the decoding operation through the iterative decoding technique. In addition, the turbo codes represent superior performance approaching the Shannon's limitation in view of a bit error rate (BER) if a size of an interleaver is large and the iterative decoding is sufficiently performed.

However, if the turbo codes are employed, the number of operations may increase, thereby causing complexity. In addition, as the number of interleavers and iterative decoding operations increase, a time delay may occur, making a real time process difficult.

$4^{th}$ generation wireless communication systems have been developed in order to provide voice and high-speed multimedia services. An error correcting code for the $4^{th}$ generation wireless communication system has not been yet determined. Because the $4^{th}$ generation wireless communication system requires a lower error rate (voice and data: $10^{-6}$ to $10^{-9}$), it is necessary to provide a new error correcting code.

Consequently, a low density parity check (LDPC) code has been suggested. The LDPC code has superior coding characteristics as compared with conventional turbo codes, in view of complexity and performance. The LDPC code is a linear block code in which most elements of a parity check matrix (H) are "0". The LDPC code could not be technically embodied at that time of invention due to the complexity of the decoding. As a result, the LDPC code has not been implemented for a long time.

Mackay and Neal have recovered the LDPC code and found that the LDPC code represents superior performance, if a simple probabilistic coding technique of the LDPC is used.

More specifically, the LDPC code is defined by a random parity check matrix H in which the number of "1" in the matrix is sparsely distributed. The parity check matrix H is a matrix for determining if the coding is normally performed with regard to the reception signal. If a value obtained through multiplying a coded reception signal by the parity check matrix H is "0", an error does not occur.

A predetermined parity check matrix, which results a value of "0" when it is multiplied by coded reception signals, is firstly designed, and then, a coding operation is performed at a transmitter encoder according the predetermined parity check matrix. The parity check matrix H has structural characteristics as follows.

First, each row is formed with elements having a value "1" with k-weights, where k is as uniformly formed as possible.

Second, each column is formed with elements having a value of "1" with j-weights. Generally, j is 3 or 4.

Third, an overlap between two columns is randomly made in such a manner that the overlap is not larger than "1". Herein, the weight signifies the number of elements, which have values other than "0", existing in each column of the parity check matrix. In addition, the overlap between two columns means an inner product between rows. Accordingly, the weight of the row and column is very small as compared with a code length.

The LDPC code can be decoded in a factor graph using an iterative decoding algorithm based on a sum-product algorithm. By employing a decoding technique using the iterative decoding algorithm based on the sum-product algorithm, a decoder employing the LDPC code has complexity that is lower than that of a decoder using the turbo code, and a parallel processing decoder can be easily embodied.

If the LDPC code is represented in the factor graph, a cycle is formed in the factor graph of the LDPC code. As generally known in the art, the iterative decoding in the factor graph of the LDPC code having the cycle is a sub-optimal decoding. In addition, an experiment shows that the LDPC code represents superior performance through the iterative decoding. However, if a plurality of cycles having a short length exist in the factor graph of the LDPC code, performance of the LPDC code may be degraded. Therefore, a number of studies have been continuously carried out in order to design the LDPC code such that the cycles having a short length may not exist in the factor graph of the LDPC code.

Due to a characteristic of a generating matrix having a high weight, the coding procedure of the LDPC code is performed using a parity check matrix having a low weight density. In particular, if a partial matrix corresponding to a parity of the parity check matrix has a uniform formation, the LDPC can be effectively coded.

Because the LDPC includes codes with various values, other than "0", it is very important to develop effective coding and decoding algorithms for various LDPC codes in order to practically utilize the LDPC code. In addition, because the parity check matrix of the LDPC code may determine performance of the LDPC code, it is very important to design the effective parity check matrix having superior performance. That is, the effective parity check matrix having superior performance and the effective coding and decoding algorithms must be simultaneously considered in order to create the LDPC code having superior performance.

As described above, the LDPC code is defined by the parity check matrix, in which most elements thereof have values of "0" and remaining elements thereof have values of "1". For example, the (N, j, k) LDPC code is a linear block code having a block length of N, in which j-elements having values of "1" are provided in each column and k-elements having values of "1" are provided in each row. Elements, except for the elements having values of "1", are defined by the parity check matrix having a sparse structure including elements having values of "0".

The LDPC code is called a "regular LDPC code", if j-weights are regularly formed in each column of the parity check matrix and k-weights are regularly formed in each row of the parity check matrix. However, if the number of weights in each column and each row of the parity check matrix is irregularly formed, the LDPC code is called a "irregular LDPC code". Generally, the irregular LDPC code has superior performance as compared with the regular LDPC code. In the irregular LDPC code, the weight in each column of the parity check matrix is not identical to the weight in each row of the parity check matrix. Accordingly, the weights in each column and each row of the parity check matrix must be properly adjusted to ensure superior performance.

Accordingly, the space-time encoder/decoder illustrated in FIGS. 1 and 2 can have superior channel coding/decoding performance, if the space-time encoder/decoder performs the coding/decoding operation using the LDPC code.

The conventional layered space-time code must perform various channel coding operations in order to obtain an optimum coding gain with respect to various antennas. Therefore, it is difficult to use various antennas. That is, a channel encoder used for two antennas cannot be used for three antennas. Using the layered space-time code, it is possible to obtain a high coding gain under high correlation between signals transmitted to antennas. However, it is impossible to make high correlation between transmission signals if a random channel code is used.

That is, using the layered space-time code, the signals are individually transmitted to the antennas, and superior performance cannot be ensured. More specifically, when the above LDPC code is used, superior performance may be ensured as correlation between bits transmitted through a multiple antenna becomes high. However, if the LDPC code is randomly designed, it is difficult to improve correlation between signals transmitted to antennas.

SUMMARY OF THE INVENTION

Accordingly, the present invention has been designed to solve the above and other problems occurring in the prior art, and it is an object of the present invention to provide a layered space-time coding/decoding apparatus and method utilizing a lifting low density parity check code for improving a correlation between bit arrays transmitted through a plurality of antennas in a wireless communication system using a plurality of antennas.

Another object of the present invention is to provide an apparatus and a method for transmitting data without an error by improving a relationship between bit arrays transmitted through a multiple antenna.

Still another object of the present invention is to provide an apparatus and a method for effectively transmitting bit arrays, if a number of antennas is larger than a number of bit arrays to be transmitted at a predetermined time.

Still another object of the present invention is to provide an apparatus and a method for expanding a layered space-time code and restoring data received through an LDPC coding scheme, thereby obtaining superior reliability.

In order to accomplish the above and other objects, according to a first aspect of the present invention, there is provided a method for transmitting a signal using a low density parity check code in a mobile communication system, which transmits the signal through a plurality of transmission antennas by space-time coding the signal. The method includes the steps of: forming a lifting low density parity check matrix by expanding values of elements in a low density parity check matrix with a sub-matrix corresponding to a number of the transmission antennas; coding the signal to be transmitted by using the lifting low density parity check matrix; and serial/parallel converting the coded signal and transmitting the coded signal through the transmission antennas.

According to a second aspect of the present invention, there is provided a method for decoding a reception signal using a low density parity check code in a mobile communication system, which transmits a signal through a plurality of transmission antennas by space-time coding the signal. The method includes the steps of: forming a lifting low density parity check matrix by expanding values of elements in a low density parity check matrix with a sub-matrix corresponding to a number of the transmission antennas; decoding the reception signal by using the lifting low density parity check matrix; and providing a reception symbol through a hard decision of the decoded signal.

According to a third aspect of the present invention, there is provided an apparatus for transmitting a signal using a low density parity check code in a mobile communication system, which transmits a signal through a plurality of transmission antennas by space-time coding the signal. The apparatus includes: a lifting low density parity check encoder forming a lifting low density parity check matrix by expanding values of elements in a low density parity check matrix with a sub-matrix corresponding to a number of the transmission antennas and coding the signal to be transmitted by using the lifting low density check matrix; and a serial/parallel converter for converting a serial coded signal into a parallel coded signal.

According to a fourth aspect of the present invention, there is provided an apparatus for decoding a reception signal using a low density parity check code in a mobile communication system, which transmits a signal through a plurality of transmission antennas by space-time coding the signal. The apparatus includes: a memory for storing a lifting low density parity check matrix by forming the lifting low density parity check matrix through expanding values of elements in a low density parity check matrix with a sub-matrix corresponding to a number of the transmission antennas; and a lifting low density check decoder for decoding the reception signal by using the lifting low density parity check matrix stored in the memory.

BRIEF DESCRIPTION OF THE DRAWINGS

The above and other objects, features, and advantages of the present invention will be more apparent from the following detailed description taken in conjunction with the accompanying drawings, in which:

FIG. 4 is a view illustrating a parity check matrix of a conventional regular LDPC code;

FIG. 7A is a view illustrating matrix variation of a lifting low density parity check code according to a first embodiment of the present invention;

FIG. 8A is a view illustrating matrix variation of a lifting low density parity check code according to a second embodiment of the present invention;

DETAILED DESCRIPTION OF THE PREFERRED EMBODIMENT

Preferred embodiments of the present invention will be described in detail herein below with reference to the accompanying drawings. In addition, a detailed description of known functions and configurations incorporated herein will be omitted when it may obscure the subject matter of the present invention.

The present invention provides a lifting LDPC code for expanding an LDPC code according to a number of antennas in a space-time encoder/decoder utilizing the lifting LDPC code. In addition, the present invention suggests a lifting LDPC code capable of improving a correlation between signals transmitted to each antenna in a space-time encoder/decoder, thereby ensuring a reliable coding/decoding of a signal.

The present invention is not limited by the following description, but is applicable for various encoders and decoders utilizing the LDPC code in a system for transmitting signals using a multiple antenna.

Prior to describing the layered space-time encoder/decoder utilizing the lifting LDPC code according to the present invention, structures of the LDPC code and lifting LDPC code used for the layered space-time encoder/decoder will be described in detail.

FIG. 4 is a view illustrating a parity check matrix of the (8,2,4) LDPC code, as an example of a (N,j,k) LDPC code. Referring to FIG. 4, the parity check matrix H of the (8,2,4) LDPC code includes eight columns and four rows. A weight of 2 is regularly added to each column. Because the weight is regularly added to each column of the parity check matrix, the (8,2,4) LDPC code becomes a regular LDPC code. If the weight is irregularly added to each column of the column, the (8,2,4) LDPC code becomes an irregular LDPC code.

Figure 1:
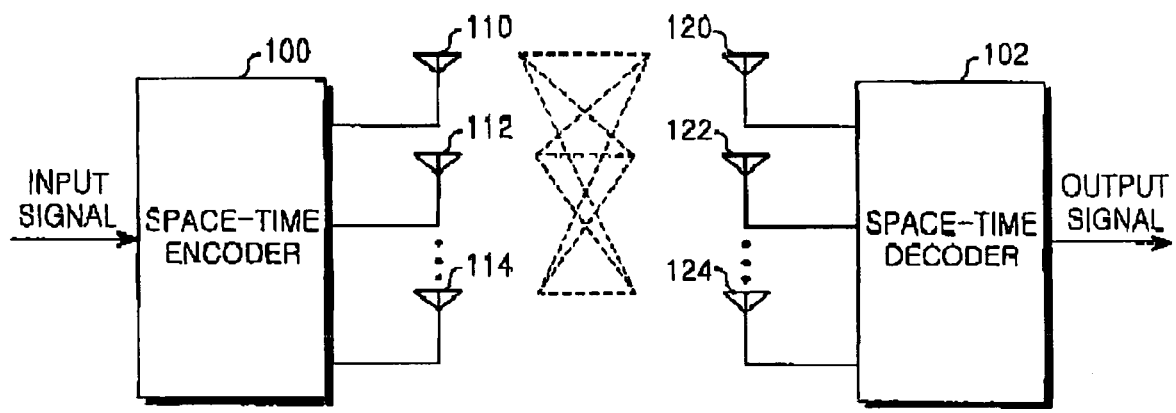
FIG. 1 is a view illustrating a conventional transmitter/receiver utilizing a general space-time coding scheme.
Figure 2:
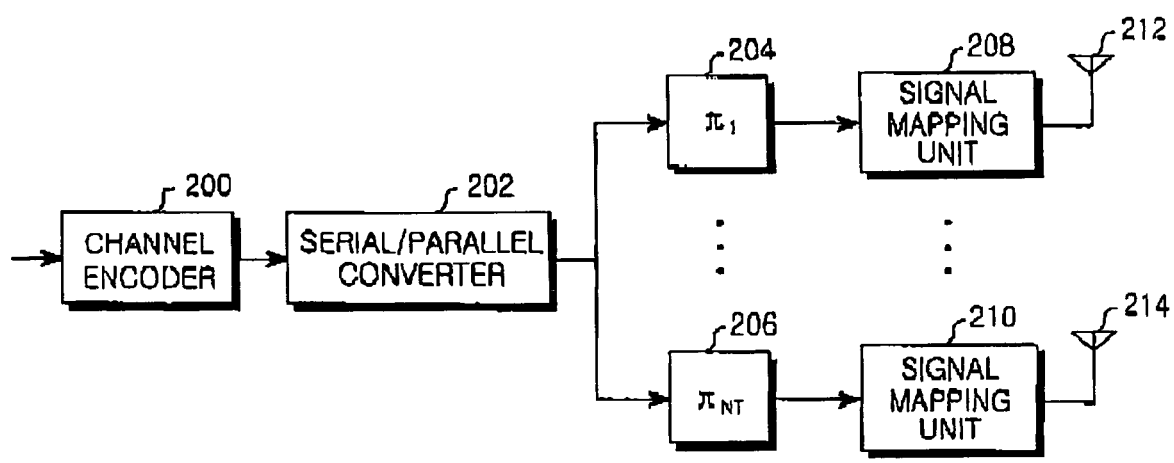
FIG. 2 is a view illustrating a conventional layered space-time encoder.
Figure 3:
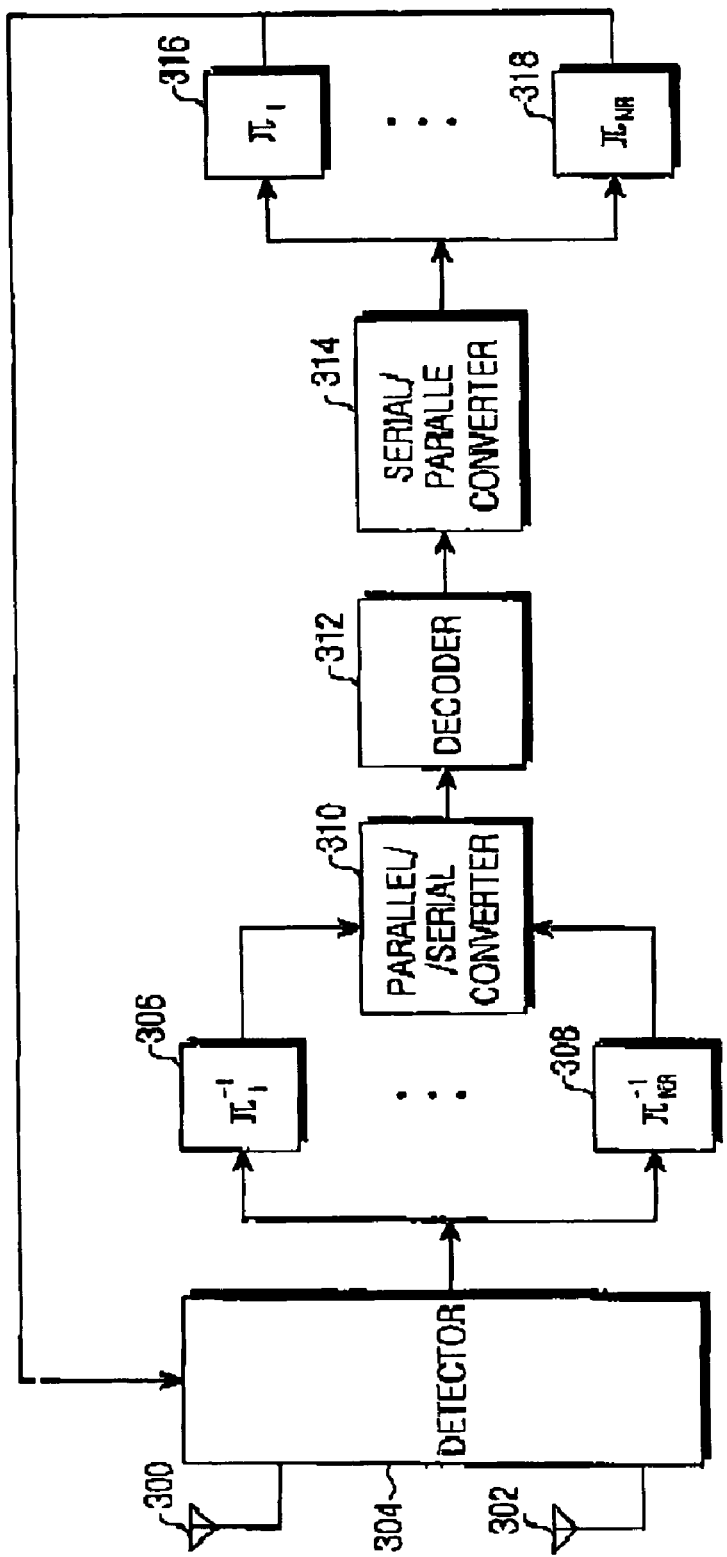
FIG. 3 is a view illustrating a conventional layered space-time decoder.
Figure 5:
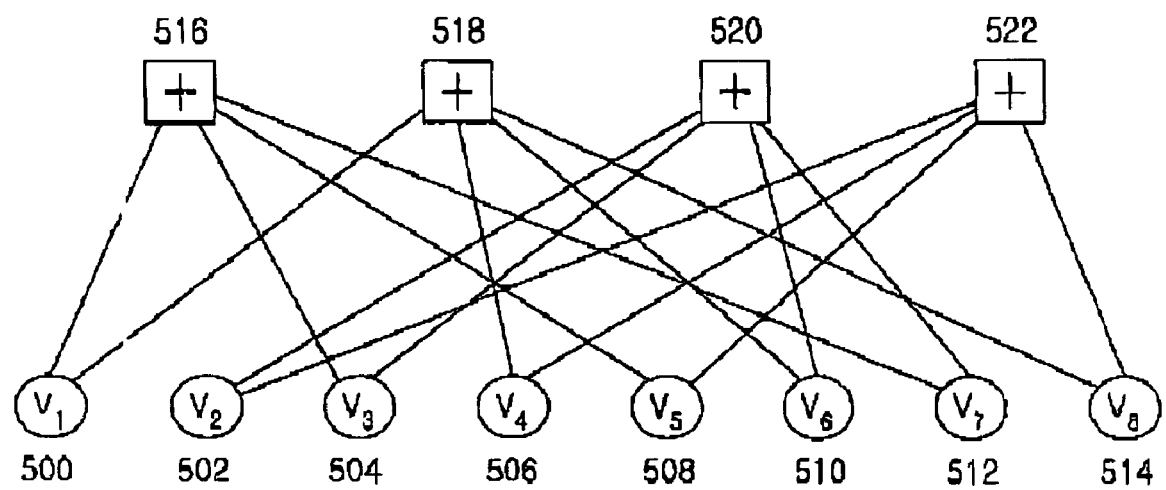
FIG. 5 is a factor graph based on the parity check matrix illustrated in FIG. 4.

FIG. 5 is a factor graph (or bipartite graph) of the regular (8,2,4) LDPC code illustrated in FIG. 4. Referring to FIG. 5, the factor graph of the regular (8,2,4) LDPC code includes eight variable nodes (i.e., $V_1$ 500 to $V_8$ 514) and four check nodes 516, 518, 520, and 522. If an element having "1" exists at a cross point between an $i^{th}$ column and a $j^{th}$ row in the parity check matrix of the (8,2,4) LDPC code, a branch is created between a variable node $V_i$ and a $j^{th}$ check node.

For example, in a first row of the parity check matrix illustrated in FIG. 4, $1^{st}$, $3^{rd}$, $5^{th}$, and $7^{th}$ columns have values of "1". Therefore, the first check node 516 illustrated in FIG. 5 is connected to $V_1$ 500, $V_3$ 504, $V_5$ 508, and $V_7$ 512. Similarly, in a second row of the parity check matrix, $1^{st}$, $4^{th}$, $6^{th}$, and $8^{th}$ columns have values of "1", and the second check node 518 is connected to $V_1$ 500, $V_4$ 506, $V_6$ 510, and $V_8$ 514. Accordingly, the third and fourth check nodes 520 and 522 can be represented in the same manner as described above.

Because the parity check matrix of the LDPC code has a smaller number of non-zero elements, the decoding can be realized even in a block code having a relatively long length through the iterative decoding. In addition, similarly to the turbo code, the LDPC code has superior performance, i.e., approaching the Shannon's channel capacity limitation, if the block length of the block code is continuously increased. In addition, Mackay and Neal have already proven that the iterative decoding procedure of the LDPC code utilizing a flow transfer scheme represents performance similar to performance of the iterative decoding procedure of the turbo code.

Hereinafter, a lifting LDPC code based on the LDPC code and used for the present invention will be described. The term "lifting" signifies a method for expanding a size of a basic matrix through a sub-matrix replacement with respect to a matrix consisting of "0" and "1". That is, according to the lifting LDPC code, a value of each element in the parity check matrix of the LDPC code is expanded through the sub-matrix replacement.

The lifting LDPC code will be described in detail with reference to FIGS. 6A to 6C.

As described above, a branch is created between a variable node $V_i$ and a $j^{th}$ check node $C_j$, if an element having a weight value of "1" exists at a cross point between an $i^{th}$ column and a $j^{th}$ row in the parity check matrix of the LDPC code. According to the lifting scheme, a predetermined k×k sub-matrix is replaced with an element having a value of "1" in the parity check matrix, such that the variable node $V_i$ is expanded into $V_{i,1}, V_{i,2}, \ldots, V_{i,k}$, and the $j^{th}$ check node $C_j$ is expanded into $C_{j,1}, C_{j,2}, \ldots, C_{j,k}$.

The expanded k-variable nodes and k-check nodes can be represented in the form of a factor graph according to the k×k sub-matrix. FIGS. 6A to 6C illustrate variations of the branch between the variable node $V_i$ and the $j^{th}$ check node $C_j$ when k of the k×k sub-matrix is 2, 3, and 4.

Figure 6A:
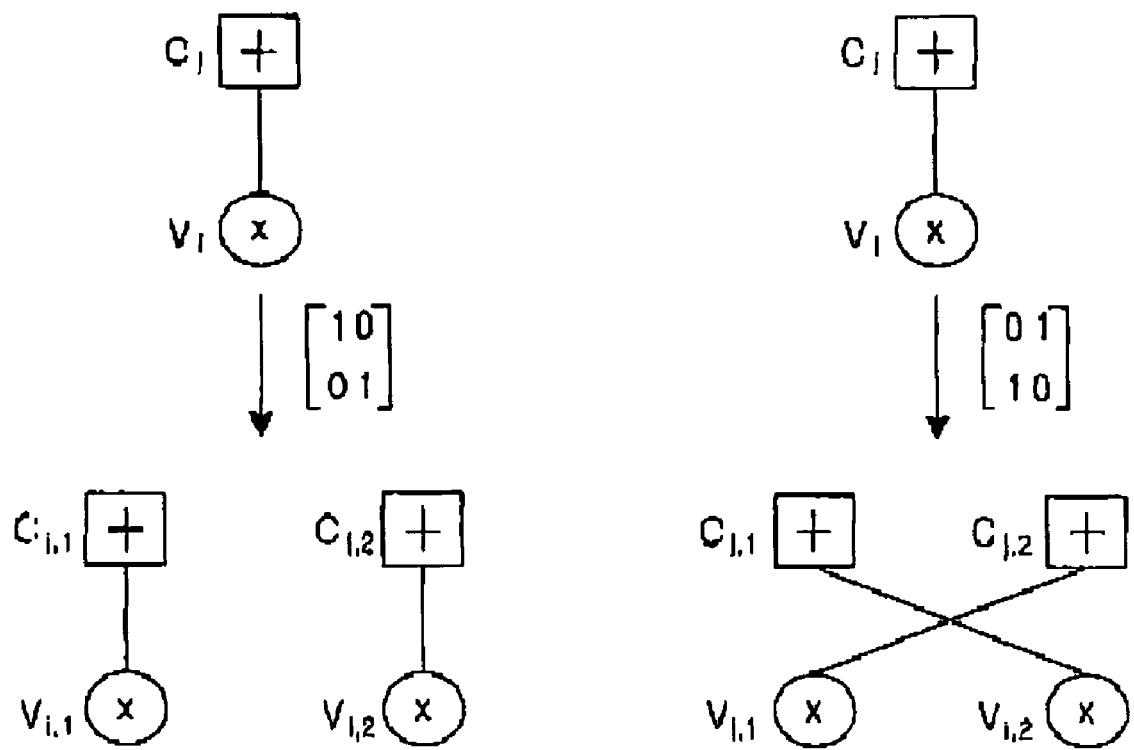
FIG. 6A is a view illustrating variation of a branch according to a lifting in a case of k=2 in a low density parity check code.

FIG. 6A illustrates a variation of the branch between the check node and the variable node, if an element having a value of "1" in the parity check matrix is replaced with two 2×2 sub-matrices, in order to use the lifting LDPC code when two transmission antennas are utilized. That is, a predetermined parity check matrix can be expanded into two matrices as illustrated in FIG. 6A in relation to the element having a value of "1". Accordingly, the element can be represented through two factor graphs including a factor graph in which $C_{j,1}$ forms a branch together with $V_{i,1}$, and $C_{j,2}$ forms a branch together with $V_{i,2}$, and a factor graph in which $C_{j,1}$, forms a branch together with $V_{1,2}$, and $C_{j,2}$ forms a branch together with $V_{i,1}$.

Figure 6B:
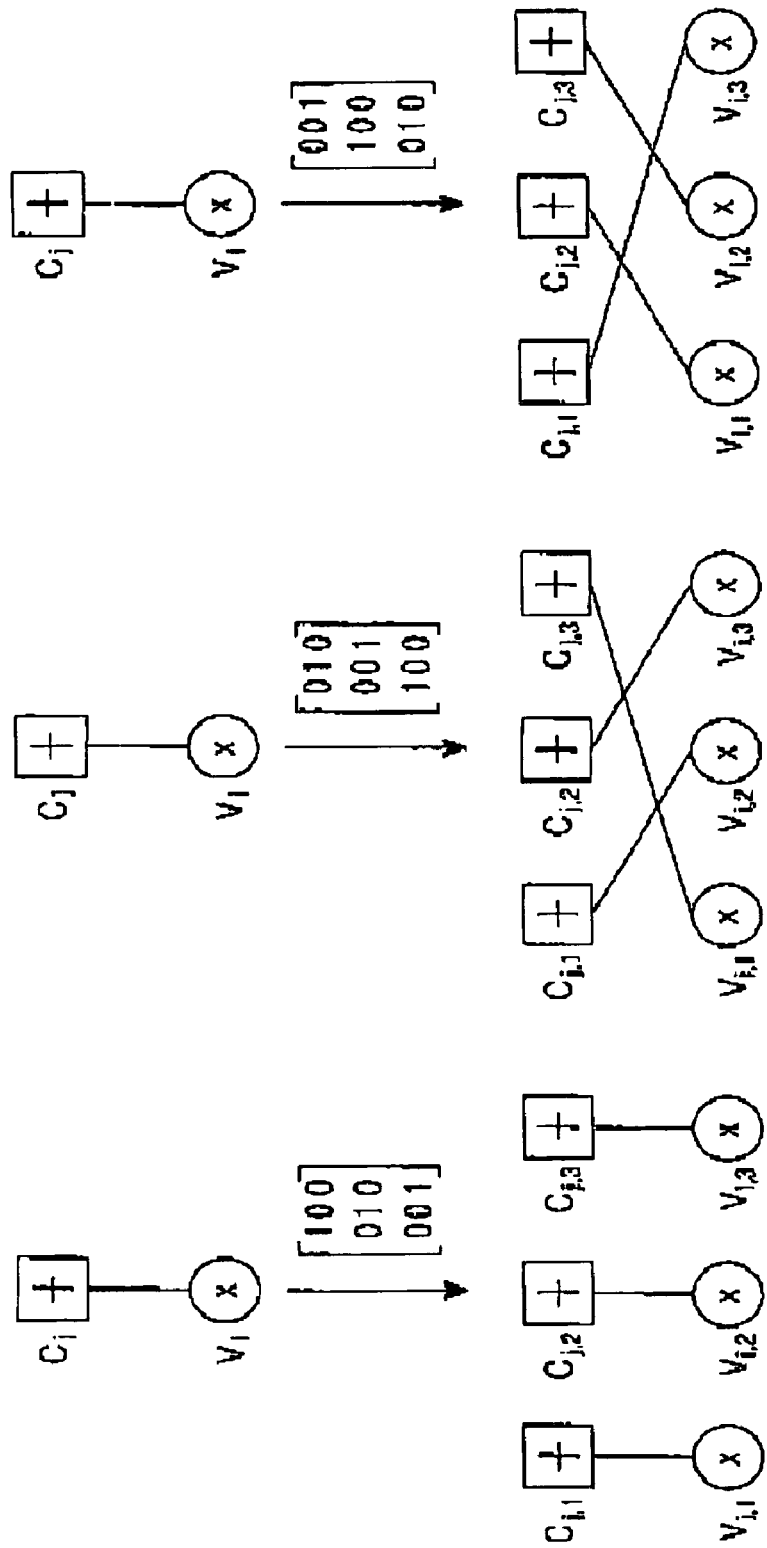
FIG. 6B is a view illustrating variation of a branch according to a lifting in a case of k=3 in a low density parity check code.

FIG. 6B illustrates a factor graph representing a variation of the branch, if the element having a value of "1" is replaced with a 3×3 sub-matrix, in order to use the lifting LDPC code when three transmission antennas are utilized. Referring to FIG. 6B, the element having a value of "1" in the parity check matrix can be represented through three factor graphs.

Figure 6C:
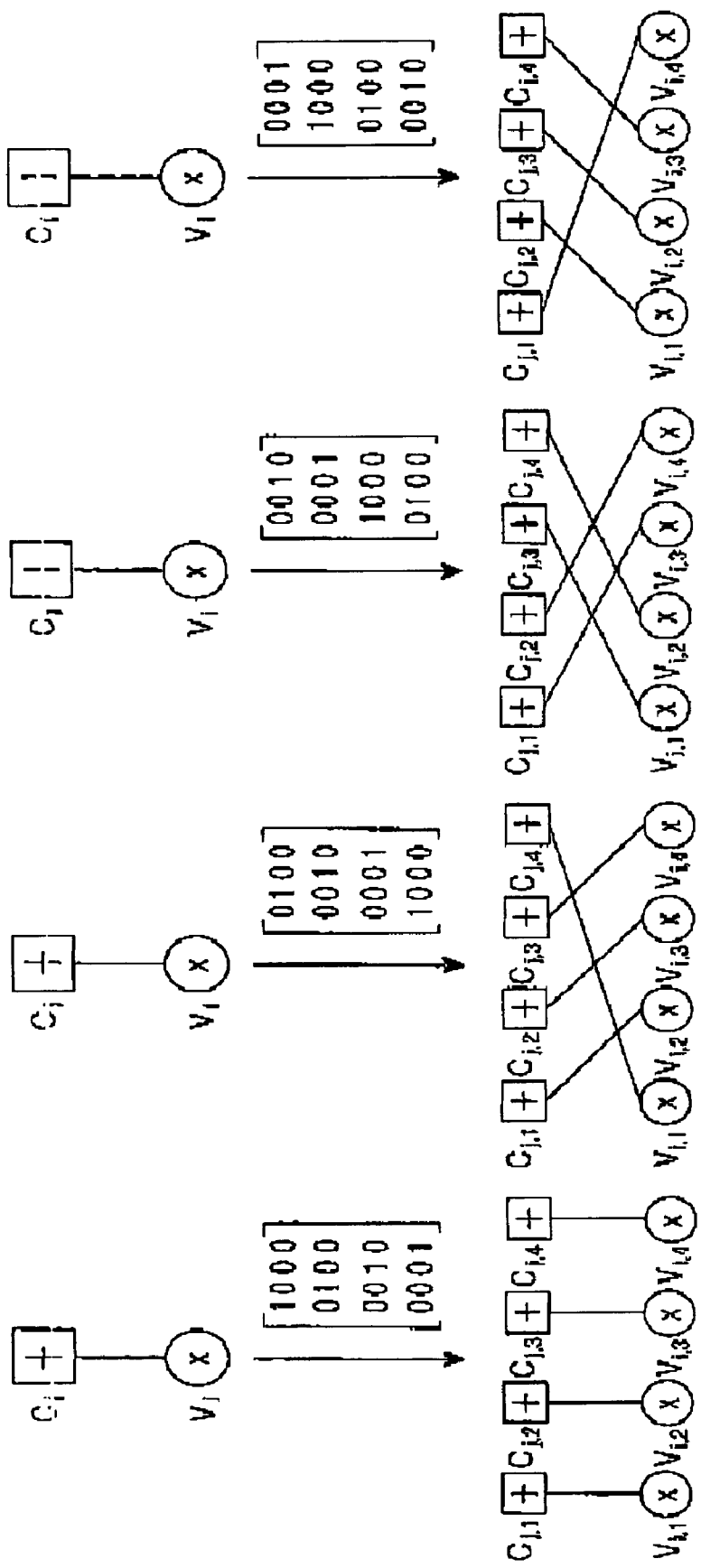
FIG. 6C is a view illustrating variation of a branch according to a lifting in a case of k=4 in a low density parity check code.

FIG. 6C illustrates a factor graph representing a variation of the branch, if the element having a value of "1" is replaced with 4×4 sub-matrices, in order to use the lifting LDPC code when four transmission antennas are utilized. Referring to FIG. 6C, the element having a value of "1" in the parity check matrix can be represented through four factor graphs.

Accordingly, besides the matrices illustrated in FIGS. 6A to 6C, other permutation matrices can be used for lifting the LDPC code.

Further, the branch can be variously changed according to the sub-matrix, which is substituted for the element "1" of the parity check matrix as illustrated in FIGS. 6A to 6C. Hereinafter, a method for utilizing the lifting LDPC code in a space-time code when two transmission antennas are used will be described with reference to FIGS. 7A to 8B.

Figure 7A:
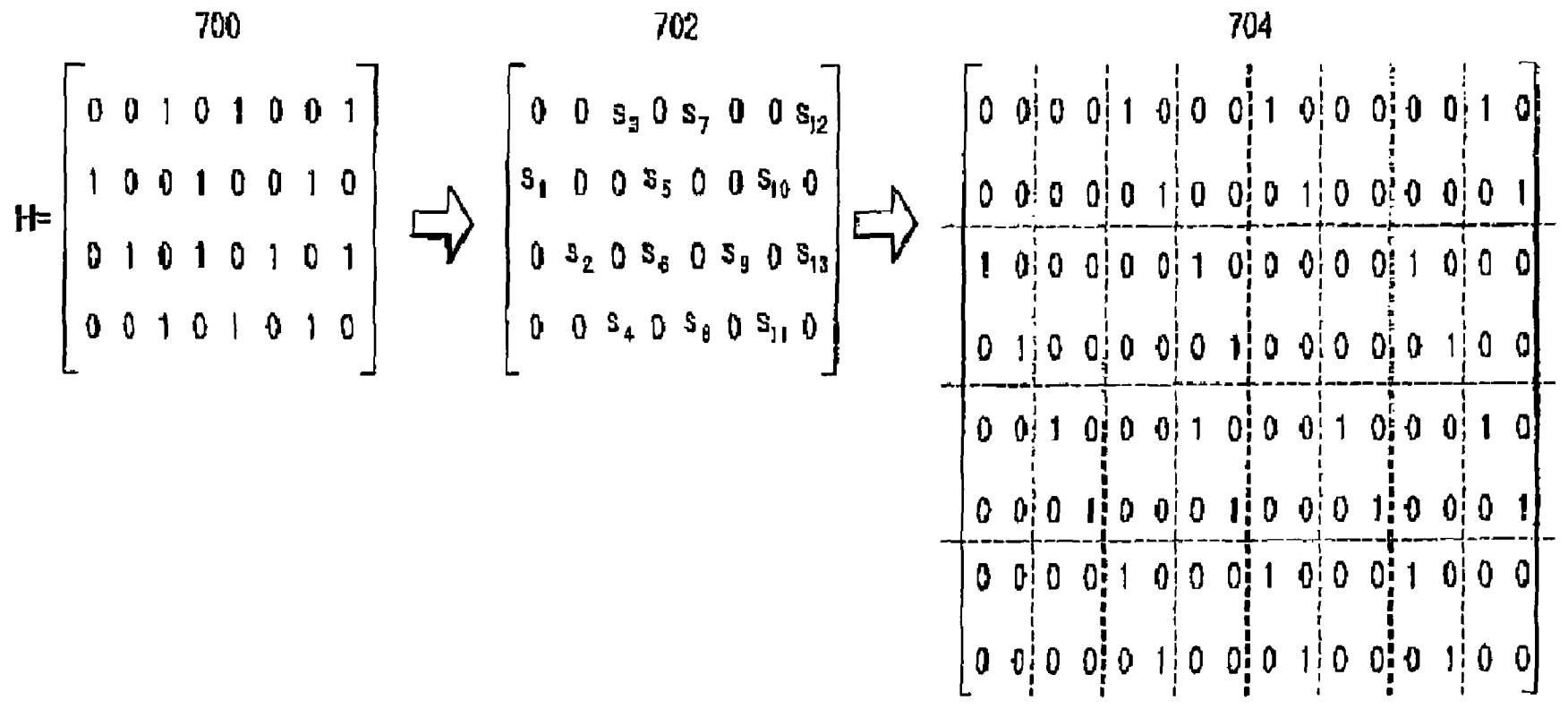
Figure 7B:
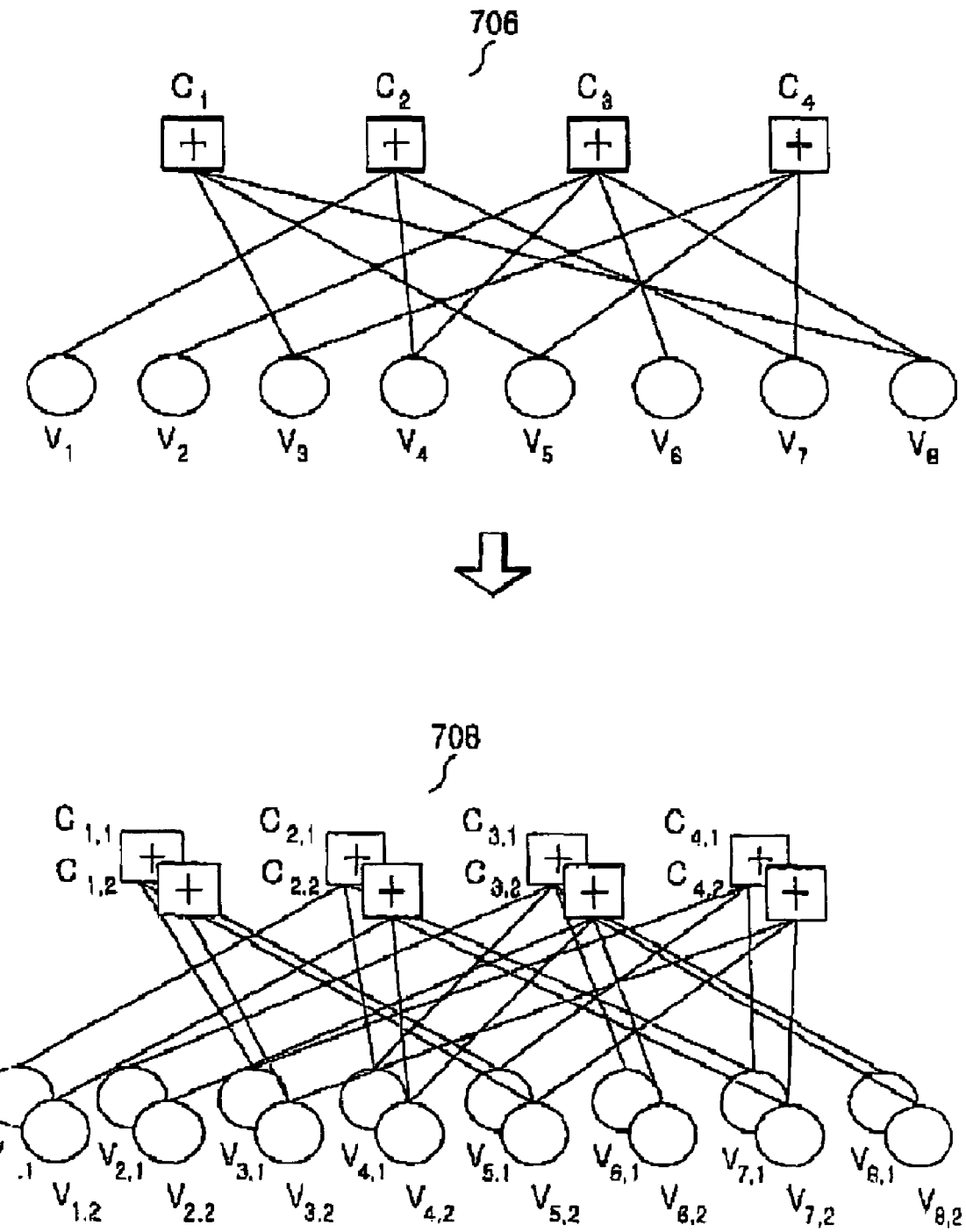
FIG. 7B is a factor graph of a lifting low density parity check matrix according to the first embodiment of the present invention.
Figure 8A:
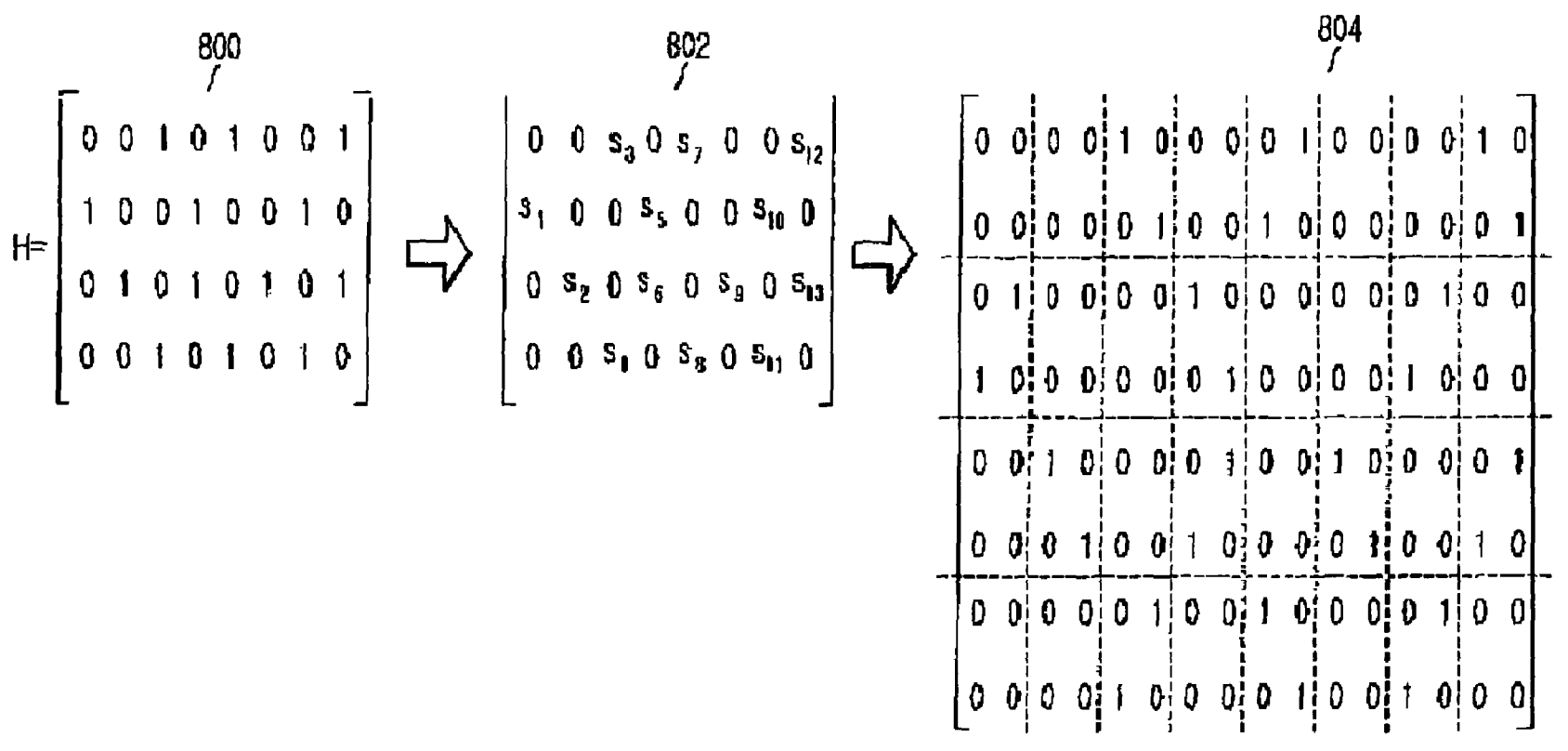
Figure 8B:
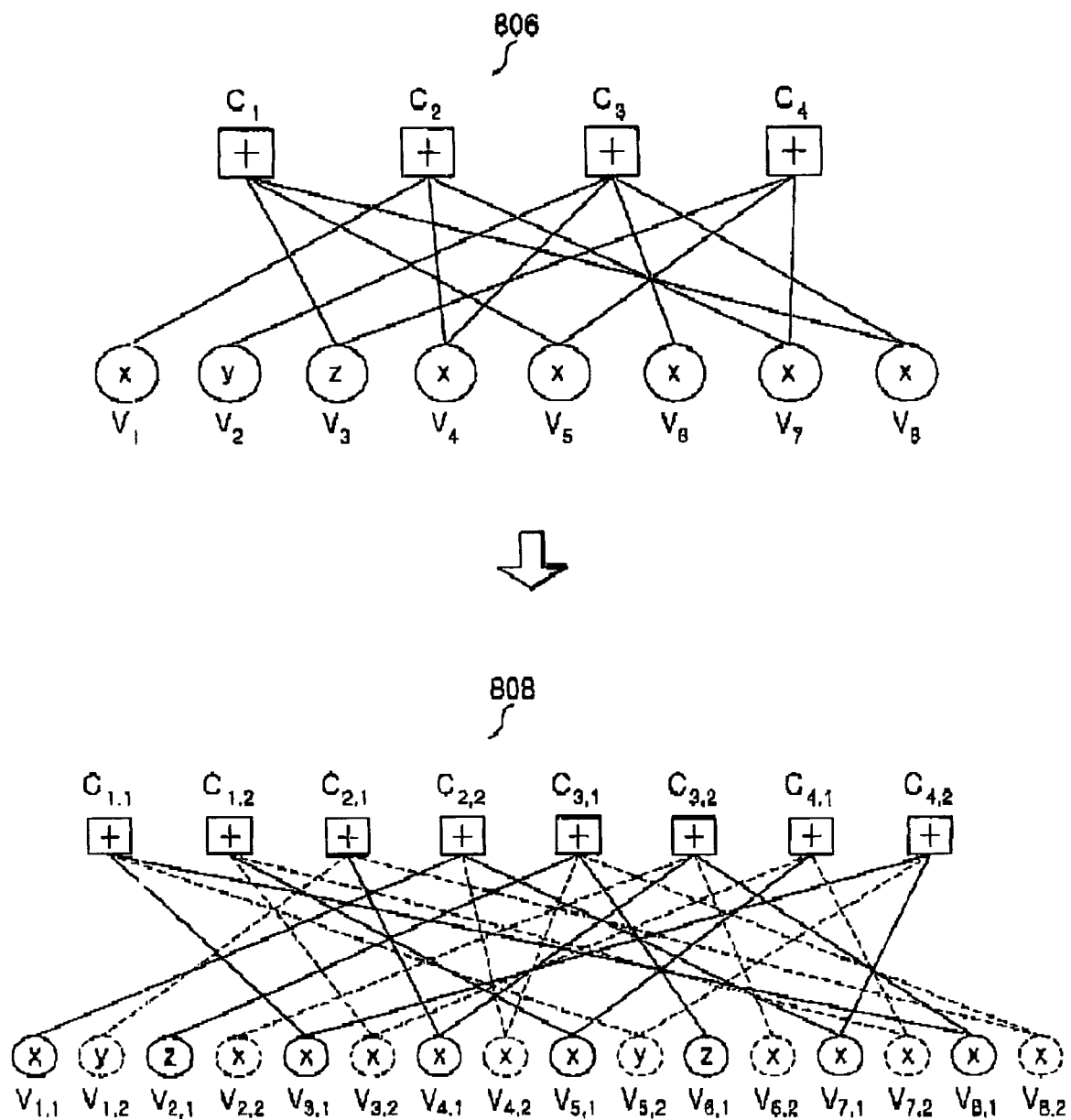
FIG. 8B is a factor graph of a lifting low density parity check matrix according to a second embodiment of the present invention.

FIG. 7A is a view illustrating matrix variation of a lifting low density parity check code according to a first embodiment of the present invention, and FIG. 7B is a factor graph representing the lifting low density parity check code shown in FIG. 7A. In addition, FIG. 8A is a view illustrating matrix variation of a lifting low density parity check code according to a second embodiment of the present invention, and FIG. 8B is a factor graph representing the lifting low density parity check code illustrated in FIG. 8A.

Embodiment 1

FIG. 7A illustrates a matrix in which an identity matrix is placed in a position of an element having a value of "1" in a 4×8 matrix 700, and a 0-matrix is placed in a position of an element having a value of "0", thereby lifting a basic 4×8 matrix 702 into a 8×16 matrix 704. Referring to FIG. 7A, the parity check matrix (H) 700 is converted into the basic 4×8 matrix 702 and each element having a value of "1" in the parity check matrix is replaced with a 2×2 matrix through a predetermined method as described with reference to FIG. 6A. That is, 13 elements having a value of "1" in the 4×8 parity check matrix (H) 700 are replaced with the 2×2 sub-matrix including $S_1$ to $S_{13}$, thereby lifting the parity check matrix (H) 700.

The 2×2 sub-matrix of $S_1$ to $S_{13}$ can be embodied in various patterns. In FIG. 7A, $S_1$ to $S_{13}$ are represented in the form of an identity matrix. Therefore, the 4×8 parity check matrix (H) 700 is lifted into the 2×2 matrix and the 8×16 matrix 704 is created.

In addition, the lifting LDPC matrix shown in FIG. 7A can be represented through a factor graph illustrated in FIG. 7B. Referring to FIG. 7B, because elements having a value of "1" in the parity check matrix 700 are replaced with the identity matrix, a factor graph 708 can be represented as two factor graphs, which are obtained by expanding a factor graph 706 by two times. Accordingly, the factor graph 708 is represented as two factor graphs 706 before the lifting has been performed.

In the factor graph 708, parts related to $V_{i,1}$ indicate data transmitted through a first antenna and parts related to $V_{i,2}$ indicate data transmitted through a second antenna.

Embodiment 2

Hereinafter, a second embodiment of the present invention for improving a correlation between bit arrays transmitted to each antenna will be described with reference to FIGS. 8A and 8B.

Generally, variable nodes connected to the same check node have a high correlation with each other during a decoding procedure. Therefore, in a layered space-time code using the lifting LDPC code according to the second embodiment of the present invention, data transmitted to different antennas are connected to the same check node, thereby improving correlation between data transmitted to a multiple antenna. For example, differently from the first embodiment illustrated in FIGS. 7A and 7B, the second embodiment illustrated in FIGS. 8A and 8B does not replace the elements having a value of "1" with the identity matrix, but replace the elements with a permutation matrix, thereby improving correlation between transmission signals.

In addition, as shown in Equation (1), two 2×2 permutation matrices may be used as the permutation matrices.

$$P_1 = \begin{bmatrix} 1 & 0 \\ 0 & 1 \end{bmatrix} P_2 = \begin{bmatrix} 0 & 1 \\ 1 & 0 \end{bmatrix} \quad (1)$$

Accordingly, if elements having a value of "1" in a 4×8 matrix 800 are sequentially replaced with $P_1$ and $P_2$ as shown in Equation 1, lifting matrices 802 and 804 can be obtained.

Referring to FIG. 8A, after forming the 4×8 party check matrix H 800, elements having the value of "1" in the parity check matrix H 800 are replaced with a 2×2 matrix through a method as described in relation to FIG. 6A. That is, 13 elements having the value of "1" in the parity check matrix H 800 are expanded into the 2×2 sub-matrix of $S_1$ to $S_{13}$, thereby lifting the parity check matrix H 800.

The 2×2 sub-matrix of $S_1$ to $S_{13}$ can be embodied in various patterns. In FIG. 8A, $S_1$ to $S_{13}$ are represented in the form of the permutation matrices $P_1$ and $P_2$. Therefore, the 4×8 parity check matrix (H) 800 is lifted into the 2×2 matrix, such that the 8×16 matrix 804 is created. That is, according to the second embodiment of the present invention, $P_1$ is applied to $S_2, S_3, S_5, S_8, S_9$, and $S_{12}$, and $P_2$ is applied to $S_1, S_4, S_6, S_7, S_{10}, S_{11}$, and $S_{13}$.

The permutation matrices $P_1$ and $P_2$ can be alternately mapped into the same position of the parity check matrix. When the sub-matrices are mapped into the position of "1", at least one of elements provided in one row must be different from other elements of the sub-matrix, such as $S_7$ of a first row consisting of $S_3$, $S_7$, and $S_{12}$.

The lifting LDPC matrix illustrated in FIG. 8A can be represented as a factor graph illustrated in FIG. 8B. Referring to FIG. 8B, because elements having a value of "1" in the lifting parity check matrix are replaced with the permutation matrix $P_1$ or $P_2$, a factor graph 808 can be represented as two factor graphs, which are obtained by expanding a factor graph 806 by two times. In addition, differently from the first embodiment illustrated in FIG. 7B, the expanded two factor graphs according to the second embodiment of the present invention correlate with each other, thereby forming a branch as illustrated in FIG. 8B. That is, because elements having a value of "1" in the lifting parity check matrix is replaced with the permutation matrix $P_1$ or $P_2$, a factor graph 808 can be represented as two factor graphs, which are obtained by expanding a factor graph 806 by two times. Herein, the permutation matrix $P_1$ or $P_2$ is a 2×2 sub-matrix. Therefore, the 4×8 lifting parity check matrix is expanded to 8×16 lifting parity check matrix. If the permutation matrix $P_1$ or $P_2$ is a 3×3 sub-matrix, the 4×8 lifting parity check matrix is expanded to 12×24 lifting parity check matrix.

More specifically, in FIG. 8B, parts represented with solid lines are branches connected to data transmitted to a first antenna, and parts represented with dotted lines are branches connected to data transmitted to a second antenna. Accordingly, it is understood from the factor graph 808 of the lifting matrix utilizing the permutation matrices that bit arrays transmitted from each antenna are connected to the same check node, differently from the bit arrays in the factor graph 708 illustrated in FIG. 7B. That is, a first check node $C_{1,1}$ forms branches together with $V_{3,1}$, $V_{5,2}$, and $V_{8,1}$ according to the lifting LDPC matrix 804 illustrated in FIG. 8A. The branches connected to the $V_{3,1}$ and $V_{8,1}$, represented with solid lines are connected to data transmitted to the first antenna. In addition, the branch connected to the $V_{5,2}$ represented with a dotted line is connected to data transmitted to the second antenna. Accordingly, it is understood that bit arrays transmitted from two antennas are connected to the same check node. The same rule is applied to remaining check nodes $C_{1,2}$ to $C_{4,2}$.

To summarize, when the lifting LDPC matrix is formed in accordance with the second embodiment of the present invention, a correlation between bit arrays transmitted from each antenna can be improved. Of course, the correlation between bit arrays transmitted from each antenna can be improved through various methods besides the above method. For example, the correlation between bit arrays can be improved by variously forming the sub-matrices when lifting the LDPC matrix.

Although the first and second embodiments of the present invention have been described in relation to two antennas, the present invention is also applicable when three antennas or more are provided, by converting a size of the lifting matrix. If three antennas are provided, the elements of the LDPC matrix are expanded into 3×3 sub-matrices. If n antennas are provided, the elements of the LDPC matrix are expanded into n×n sub-matrices. Accordingly, various sub-matrices can be utilized in order to improve relationship between data transmitted through each antenna.

Figure 9:
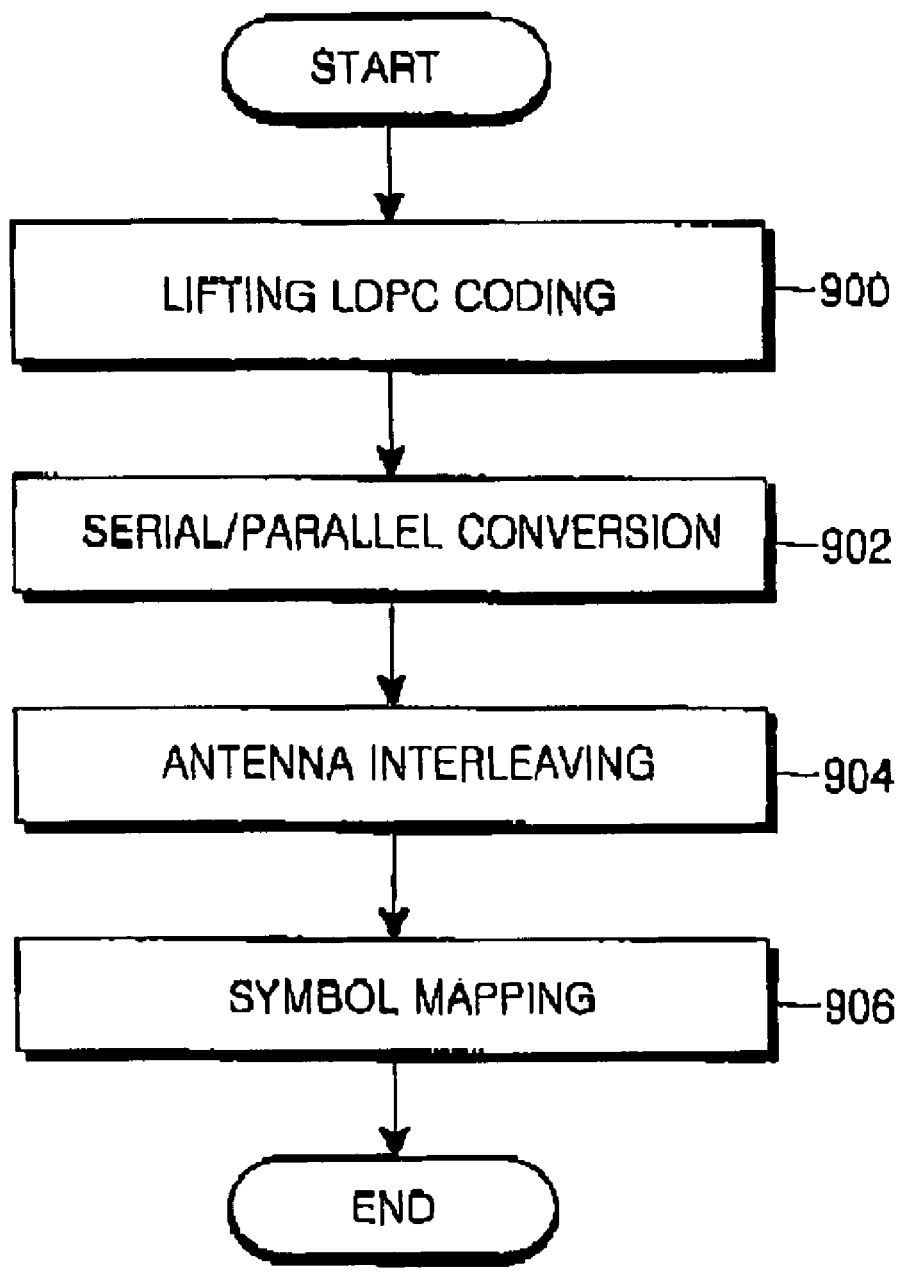
FIG. 9 is a flowchart illustrating a coding procedure of a layered space-time encoder utilizing a lifting low density parity check code according to an embodiment of the present invention.

FIG. 9 is a flowchart illustrating a coding procedure of a space-time encoder utilizing a lifting low density parity check code according to an embodiment of the present invention. Referring to FIG. 9, a lifting LDPC coding is performed on data to be transmitted by a number of antennas in step 900. A lifting LDPC coding scheme is identical to the LDPC coding scheme as described with reference to FIGS. 7A to 8B. The LDPC coded data is serial-parallel converted in step 902 and distributed, in order to be transmitted through multiple transmission antennas. The distributed data may pass through transmission antenna interleaving in step 904. However, it is not necessary to provide transmission antenna interleavers having the same structures. The data passing through the transmission antenna interleaving step in 904 is input into a signal mapping unit in order to perform a symbol mapping with respect to the data input thereto in step 906. The data is then transmitted through the multiple transmission antennas.

Figure 10:
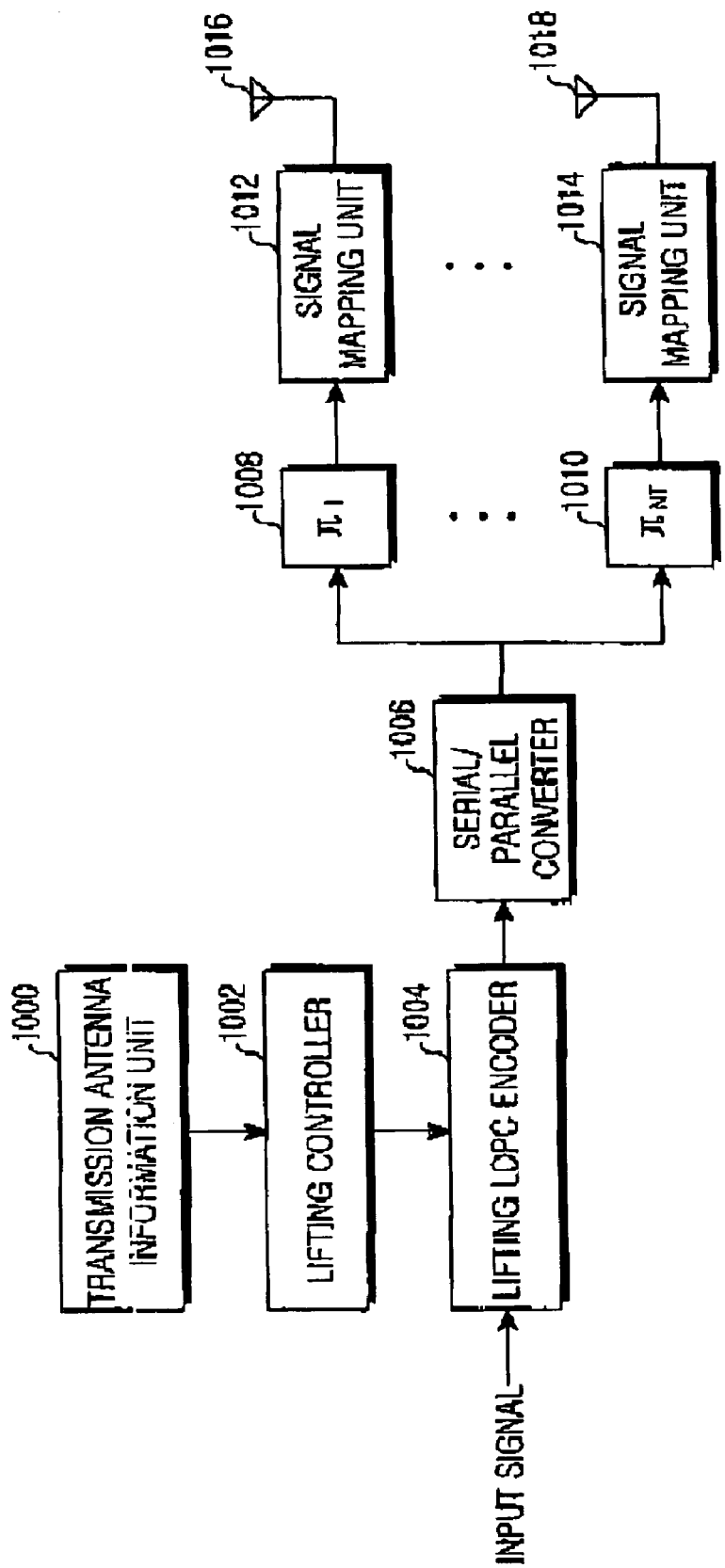
FIG. 10 is a block diagram illustrating a layered space-time encoder utilizing a lifting low density parity check code according to an embodiment of the present invention.

FIG. 10 is a block diagram illustrating a space-time encoder utilizing a lifting low density parity check code according to an embodiment of the present invention. Hereinafter, the space-time encoder utilizing a lifting low density parity check code will be referred to as "a lifting LDPC space-time encoder".

Referring to FIG. 10, the lifting LDPC space-time encoder includes a lifting LDPC encoder 1004, a serial/parallel converter 1006, and interleavers 1008 to 1010 and signal mapping units 1012 to 1014 corresponding to transmission antennas 1016 to 1018. In addition, the lifting LDPC space-time encoder includes a transmission antenna information unit 1000 for inputting information related to the number of the transmission antennas and a controller 1002 for controlling a lifting according to the number of the transmission antennas are provided.

The number of the interleavers 1008 to 1010 and signal mapping units 1012 to 1014 corresponds to the number of the transmission antennas. The interleavers 1008 to 1010 and signal mapping units 1012 to 1014 have the same structures or different structures, respectively. In FIG. 10, the number of transmission antennas is $N_T$, and the number of the interleavers and signal mapping units is also $N_T$, respectively.

The transmission antenna information unit 1000 transmits information related to the number of the transmission antennas 1016 to 1018 to the lifting controller 1002 in order to enable the lifting LDPC space-time encoder to create a proper lifting LDPC code that corresponds to the number of the transmission antennas 1016 to 1018.

In addition, the lifting controller 1002 receiving the information related to the number of the transmission antennas 1016 to 1018 controls the lifting LDPC encoder 1004 in order to enable the lifting LDPC encoder 1004 to perform the lifting LDPC coding according to the number of the transmission antennas. That is, in order to perform the lifting LDPC space-time coding, a lifting LDPC coding is performed with respect to signals input into the lifting LDPC encoder 1004 using the LDPC codes having superior performance under the control of the lifting controller 1002 corresponding to the number of the transmission antennas, which is obtained using information from the transmission antenna information unit 1000.

Output data of the lifting LDPC encoder 1004 is distributed to $N_T$ transmission antennas through the serial/parallel converter 1006. The data distributed to the transmission antennas is interleaved through the antenna interleavers 1008 to 1010. The data passing through the antenna interleavers 1008 to 1010 is symbol-mapped through the signal mapping units 1012 to 1014 before it is transmitted to the transmission antennas 1016 to 1018. The signal mapping units 1012 to 1014 can perform the symbol mapping with respect to the data through various modulation schemes, such as BPSK, QPSK, 16 QAM, 64 QAM, and 128 QAM. The output data of the signal mapping units 1012 to 1014 is transmitted through the $N_T$ transmission antennas 1016 to 1018.

The conventional LDPC encoder distributes input signals into each of transmission antennas without performing the above lifting procedure. As a result, it is difficult to design LDPC codes that correspond to the number transmission antennas.

However, according to the present invention, the LDPC code is lifted according to a predetermined rule based on the number of the transmission antennas. As a result, the LDPC coding can be easily achieved. In addition, the lifting can be obtained through various lifting schemes, such that a correlation between data transmitted through the transmission antennas may be improved, thereby lowering an error rate caused by inferior channel environment.

Figure 11:
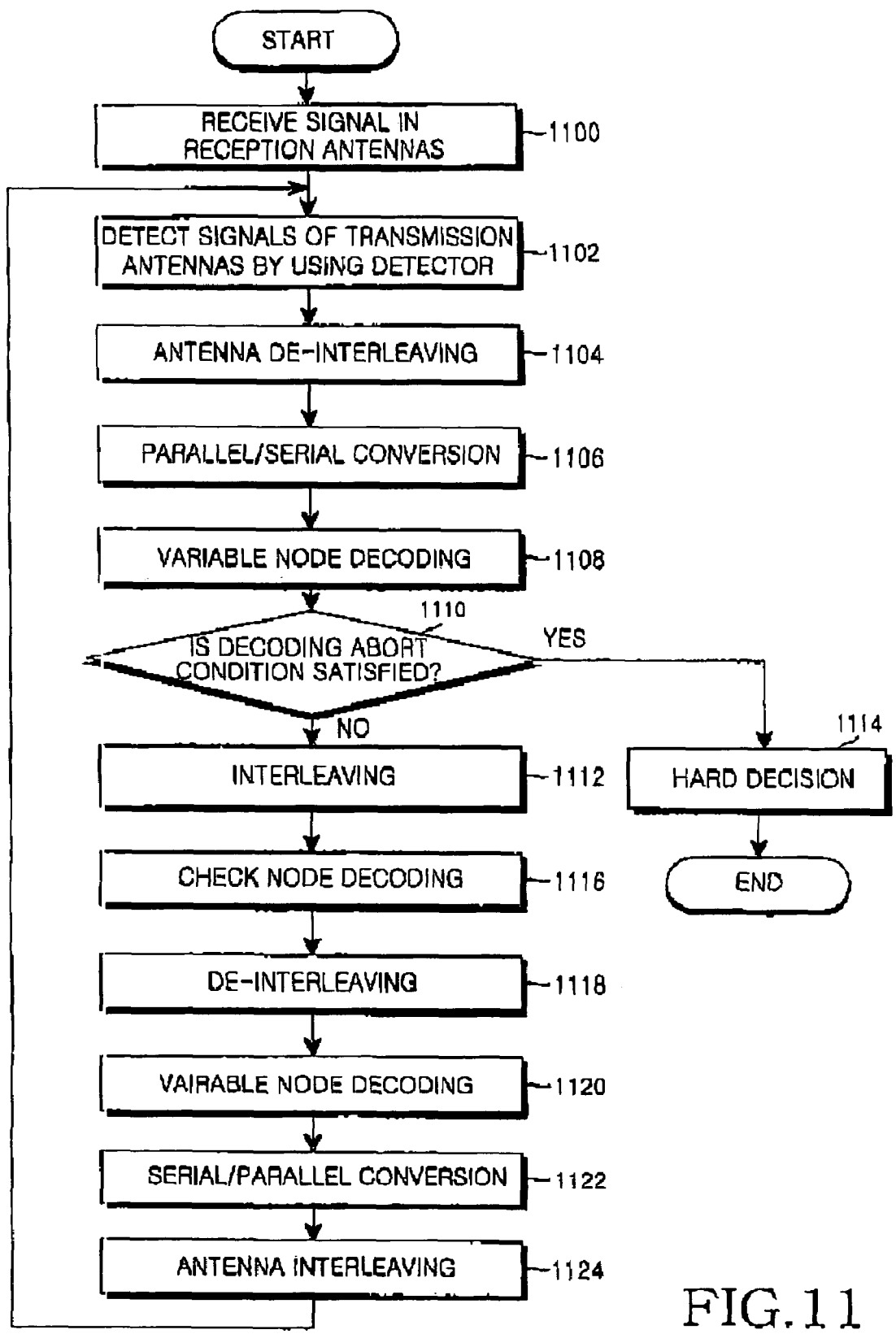
FIG. 11 is a flowchart illustrating a decoding procedure of a layered space-time decoder utilizing a lifting low density parity check code according to an embodiment of the present invention.

FIG. 11 is a flowchart illustrating a decoding procedure of a space-time decoder utilizing a lifting low density parity check code according to an embodiment of the present invention. Referring to FIG. 11, signals transmitted from the $N_T$ transmission antennas are received in $N_R$ reception antennas in step 1100. Each of the reception antennas may receive all of signals transmitted from the $N_T$ transmission antennas. That is, a first reception antenna can receive the signals transmitted from the first to $N_T{}^{th}$ transmission antennas. In the same way, each of the second to $N_R{}^{th}$ reception antennas can receive the signals transmitted from the first to $N_T{}^{th}$ transmission antennas.

The signals transmitted from each of the transmission antennas are detected through a detector based on the signals received in each of the reception antennas in step 1102. The signals can be detected through various detection schemes. Additionally, as the detection schemes for the signals do not directly relate to the present invention, so they will not be further described below.

When the signals transmitted from a $j^{th}$ transmission antenna are detected, data transmitted during a $k^{th}$ interval can be represented as a vector $x_k$ including $N_T$ elements and data received during the $k^{th}$ interval can be represented as a vector $y_k$ including $N_R$ elements. In addition, if a fading channel value is an $N_R \times N_T$ matrix ($H_k$) and noise is a vector $N_k$ including $N_R$ elements, the reception data $y_k$ are represented as shown in Equation (2).

$$y_k = H_k x_k + n_k \quad (2)$$

If a plurality of bits ($b^1{}_j$, $b^2{}_j$, ..., $b^n{}_j$) form a signal $x_j$ transmitted from a $j^{th}$ antenna through $N_T$ signal mapping units, an LLR (log likelihood ratio) of the detector with respect to an $i^{th}$ bit ($b^i{}_j$) can be represented as shown in Equation (3).

$$L^i_j = \log \frac{P(b^i_j = +1 \mid y_k)}{P(b^i_j = -1 \mid y_k)} \quad (3)$$

A detection value of the $i^{th}$ bit ($b^i{}_j$) transmitted to the $j^{th}$ antenna is de-interleaved through a de-interleaver of an interleaver used in the $j^{th}$ antenna in step 1104. Besides the detection value of the $i^{th}$ bit ($b^i{}_j$) transmitted to the $j^{th}$ antenna, detection values of data transmitted from other transmission antennas are also de-interleaved.

The data passing through the $N_R$ antenna de-interleavers is input into the parallel/serial converter such that parallel data is converted into serial data in step 1106. An output value of the parallel/serial converter is subject to a first variable node decoding according to a predetermined lifting scheme, which may vary depending on the number of the transmission antennas in step 1108.

After the variable node coding has been performed, it is determined if a decoding abort condition is satisfied in step 1110. If the decoding abort condition is satisfied, a hard decision of output data of the variable node decoder is performed to stop the decoding in step 1114.

In addition, the decoding abort condition can be set in match with iterative decoding times. That is, it is possible to stop the decoding procedure after performing the decoding procedure by predetermined times. In addition, the decoding abort condition can be set in match with other conditions. In this case, the decoding procedure will be stopped if a predetermined value of the other conditions is represented.

If the decoding abort condition is not satisfied in step 1110, the data is interleaved by the interleaver, under the control of the control unit, based on the parity check matrix stored in a memory in step 1112. Output data of the interleaver is subject to the check node decoding according to a predetermined lifting scheme, which may vary depending on the number of the transmission antennas in step 1116.

In step 1118, the data used for the check node decoding pass through a de-interleaver under the control of the control unit based on the parity check matrix stored in the memory.

The de-interleaved data is subject to a second variable node decoding through the above lifting schemes in step 1120. A variable node decoding value is converted into a parallel value through a serial/parallel converter in step 1122 and input into the detector in step 1102, after being subject to the $N_T$ antenna interleaving in step 1124.

Accordingly, the decoding procedure is repeatedly performed so that the reception signal can be precisely decoded. After the first variable node decoding step, the hard decision of decoded signal is made by taking the decoding abort condition into consideration, thereby finally outputting the decoded signal.

In the above decoding procedure, the antenna de-interleaving, antenna interleaving, variable node decoding, and check node decoding steps are performed according to the lifting LDPC code of the present invention. That is, the antenna de-interleaving, antenna interleaving, variable node decoding, and check node decoding steps are performed in accordance with the LDPC code lifted according to the number of the transmission antennas.

Because the signals transmitted from the transmission antennas and detected from signals received in the reception antennas of the decoder have high correlation with each other, the decoding can be effectively performed even if channel environments of the signals transmitted from the transmission antennas are different from each other.

Figure 12:
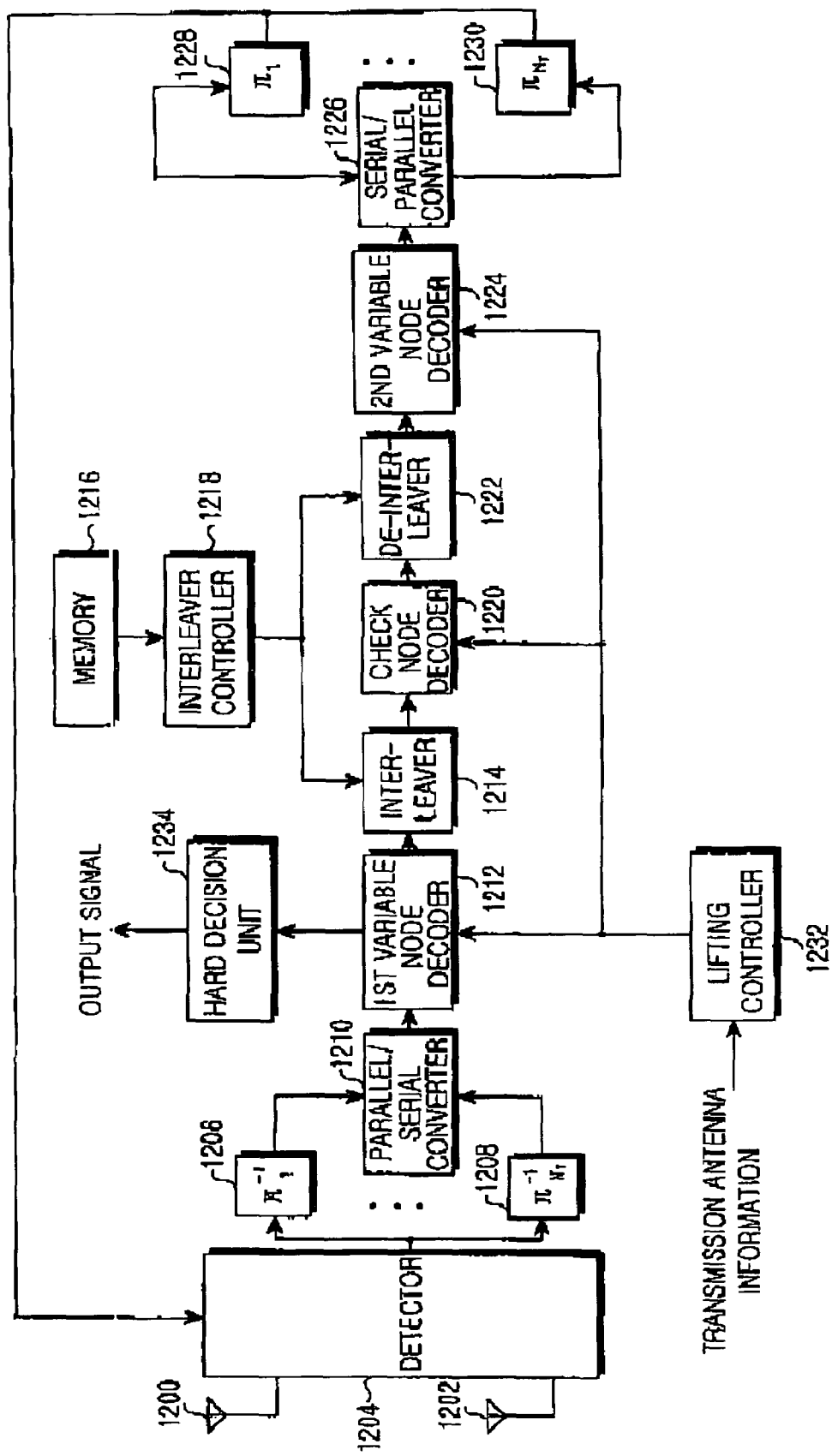
FIG. 12 is a block diagram illustrating a layered space-time decoder utilizing a lifting low density parity check code according to an embodiment of the present invention.

FIG. 12 is a block diagram illustrating a space-time decoder utilizing a lifting low density parity check code according to an embodiment of the present invention. Referring to FIG. 12, the lifting LDPC space-time decoder includes $N_R$ multiple reception antennas 1200 to 1202, a detector 1204, $N_R$ antenna de-interleavers 1206 to 1208, a parallel/serial converter 1210, a first variable node coder 1212, a second variable node coder 1224, a check node decoder 1220, an interleaver 1214, a de-interleaver 1222, a serial/parallel converter 1226, and a hard decision unit 1234. In addition, a memory 1216, an interleaver controller 1218 and a lifting controller 1232 are provided in order to perform the lifting LDPC space-time decoding according to the present invention.

Further, antenna interleavers 1228 to 1230 and antenna de-interleavers 1206 to 1208 may process the transmission signals of each transmission antenna. Preferably, the number of the antenna interleavers 1228 to 1230 and antenna de-interleavers 1206 to 1208 is equal to the number of the transmission antennas.

The memory 1216 stores the parity check matrix of the LDPC code before the lifting, and the interleaver controller 1218 controls the interleaver 1214 and the de-interleaver 1222 using the parity check matrix stored in the memory 1216. In addition, the lifting controller 1232 controls the variable node decoders 1212 and 1214 and the check node decoder 1220 according to a predetermined lifting scheme, which may vary corresponding to variation of the number of the transmission antennas.

As described above, each of the multiple reception antennas 1200 to 1202 can receive all signals transmitted from multiple transmission antennas. That is, the first multiple reception antenna 1200 can receive all signals transmitted from the $N_T$ transmission antennas 1010 to 1012 illustrated in FIG. 10 and the $N_R^{th}$ multiple reception antenna 1202 also receives all signals transmitted from the $N_T$ transmission antennas 1010 to 1012 illustrated in FIG. 10.

The signals received in the reception antennas are input into the detector 1204, and the detector 1204 detects the signals transmitted from the transmission antennas 1014 to 1016 based on the received signals and outputs data of the antenna interleavers 1228 to 1230 through the above mentioned detection scheme. Output data of the detector 1204 is input into the $N_T$ antenna de-interleavers 1206 to 1208.

The antenna de-interleaver 1206 corresponds to the antenna interleaver 1006 illustrated in FIG. 10 and restores the interleaving data into original data. Output data of the antenna de-interleavers 1206 to 1208 is input into the parallel/serial converter 1210 such that serial data is output from the parallel/serial converter 1210. In addition, the output data of the parallel/serial converter 1210 is input into the first variable node decoder 1212. The first variable node decoder 1212 calculates a probability value of the signals input thereto and updates and outputs the probability value of the signals.

The lifting controller 1232 controls the first variable node decoder 1212 in such a manner that the first variable node decoder 1212 can perform the variable node decoding according to the number of the transmission antennas, based on information related to the transmission antennas. As described with reference to FIGS. 7A to 8B, one variable node and one check node are expanded into $N_T$ variable nodes and $N_T$ check nodes, respectively, according to the predetermined lifting scheme, while forming branches between the variable nodes and check nodes.

The variable node coding of the first variable node decoder 1212 is performed based on the probability value of the signals transferred through the branch formed between the variable node and the check node. The probability value of the signals is transferred from the $N_T$ variable nodes to $N_T$ check nodes according to the predetermined lifting scheme.

Output data of the first variable node decoder 1212 is input into the interleaver 1214. The output data passing through the interleaver 1214 decoded by means of the check node decoder 1220.

The check node decoder 1220 updates and outputs the probability value of the signals according to a check node update rule. Similarly, the probability value of the signals transferred to the variable nodes from the check nodes can be obtained through the lifting scheme provided by the lifting controller 1232 according to information of the transmission antennas.

The output data of the check node decoder 1220 passes through the de-interleaver 1222 under the control of the interleaver controller 1218 based on the parity check matrix of the LDPC code stored in the memory 1216 and input into the second variable node decoder 1224. The second variable node decoder 1224 calculates the probability value to be transferred to the detector 1204 according to the update rule based on the probability value transferred thereto from the from the check nodes.

The variable node decoding is also performed using the second variable node decoder 1224 according to the lifting scheme in match with the number of the transmission antennas. Output data of the second variable node decoder 1224 is output as parallel data through the serial/parallel converter 1226 and the parallel data is input into the $N_T$ antenna interleavers 1228 to 1230. The antenna interleavers 1228 to 1230 have functions identical to those of the antenna interleavers 1006 to 1008 illustrated in FIG. 10.

The output data of the antenna interleavers 1228 and 1230 is again input into the detector for the purpose of the iterative decoding. By performing the iterative decoding through the above procedure, the lifting LDPC space-time decoding can be achieved with superior reliability. As described above, the iterative decoding is repeatedly performed. When the iterative decoding has been completed, the hard decision unit 1234 decides the hard decision of the output data of the variable node decoder 1212, and the final decoding signal is output.

As described above, according to the present invention, the lifting LDPC code is used for the space-time coding in order to improve a relationship between bit arrays transmitted from the multiple antennas, thereby enabling data to be transmitted without an error. The received data can be precisely restored due to an effective antenna diversity, and superior reliability of data can be achieved.

In addition, the present invention provides the space-time code having superior performance through a simple coding/decoding scheme. The present invention is adaptable for a system including a plurality of transmission/reception antennas.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting a signal using a low density parity check code in a mobile communication system that transmits the signal through a plurality of transmission antennas by space-time coding the signal, the method comprising:
   forming a lifting low density parity check matrix by expanding values of elements in the low density parity check matrix to a sub-matrix corresponding to a number of the plurality of transmission antennas;
   coding the signal to be transmitted using the lifting low density parity check matrix;
   serial to parallel converting the coded signal; and
   transmitting the coded signal through the plurality of transmission antennas,
   wherein, if the values of the elements in the low density check matrix are "1", each of the values of the elements is expanded to a matrix selected from permutation matrices formed by exchanging rows of an identity matrix, and
   wherein at least one of the elements having values of "1" in a row of the low density parity check matrix is expanded to a sub-matrix including 2×2 identity matrix.

2. The method as claimed in claim 1, wherein when the number of the plurality of transmission antennas is $N_T$, the sub-matrix has a size of $N_T \times N_T$.

3. The method as claimed in claim 1, wherein the lifting low density parity check matrix expanded to the sub-matrix includes the low density parity check matrix.

4. The method as claimed in claim 1, wherein, if the values of the elements in the low density check matrix are "0", each of the values of the elements is expanded to a "0"-matrix.

5. A method for decoding a reception signal using a low density parity check code in a mobile communication system that transmits a signal through a plurality of transmission antennas by space-time coding the signal, the method comprising:

forming a lifting low density parity check matrix by expanding values of elements in the low density parity check matrix to a sub-matrix corresponding to a number of the plurality of transmission antennas;

decoding the reception signal using the lifting low density parity check matrix; and providing a reception symbol through a decision of the decoded signal, wherein, if the values of the elements in the low density check matrix are "1", each of the values of the elements is expanded to a matrix selected from permutation matrices formed by exchanging rows of an identity matrix, and wherein at least one of the elements having values of "1" in a row of the low density parity check matrix is expanded to a sub-matrix including a 2×2 identity matrix.

6. The method as claimed in claim 5, wherein when the number of the plurality of transmission antennas is $N_T$, the sub-matrix has a size of $N_T \times N_T$.

7. The method as claimed in claim 5, wherein the lifting low density parity check matrix expanded to the sub-matrix includes the low density parity check matrix.

8. The method as claimed in claim 5, wherein, if the values of the elements in the low density check matrix are "0", each of the values of the elements is expanded to a "0" matrix.

9. The method as claimed in claim 5, further comprising classifying the reception signal into several groups, each of which is distributed into each of the plurality of transmission antennas, before decoding the reception signal.

10. The method as claimed in claim 5, further comprising performing an iterative decoding according to a decoding scheme of the low density parity check code by repeating a decoding step for a check node, after decoding the reception signal.

11. The method as claimed in claim 5, wherein the decision is hard decision.

12. An apparatus for transmitting a signal using a low density parity check code in a mobile communication system that transmits a signal through a plurality of transmission antennas by space-time coding the signal, the apparatus comprising:

a lifting low density parity check encoder for forming a lifting low density parity check matrix by expanding values of elements in the low density parity check matrix to a sub-matrix corresponding to a number of the plurality of transmission antennas and coding the signal to be transmitted using the lifting low density check matrix; and a serial to parallel converter for converting a serial coded signal into a parallel coded signal, wherein, if the values of the elements in the low density check matrix arc "1", each of the values of the elements is expanded to a matrix selected from permutation matrices formed by exchanging rows of an identity matrix, and wherein at least one of the elements having values of "1" in a row of the low density parity check matrix is expanded to a sub-matrix including a 2×2 identity matrix.

13. The apparatus as claimed in claim 12, further comprising a lifting controller for controlling the lifting low density parity check encoder according to information related to the number of the plurality of transmission antennas.

14. The apparatus as claimed in claim 12, further comprising:

a plurality of interleavers for interleaving signals transmitted through each of the plurality of transmission antennas in order to differentiate signals, which are serial/parallel converted through the serial/parallel converter, according to the plurality of transmission antennas; and a plurality of signal mapping units for mapping the signals output from each of the interleavers with a predetermined symbol.

15. The apparatus as claimed in claim 12, wherein when the number of the plurality of transmission antennas is $N_T$, the sub-matrix has a size of $N_T \times N_T$.

16. The apparatus as claimed in claim 12, wherein the lifting low density parity check matrix expanded to the sub-matrix includes the low density parity check matrix.

17. The apparatus as claimed in claim 12, wherein, if the values of the elements in the low density check matrix are "0", each of the values of the elements is expanded to a "0"-matrix.

18. An apparatus for decoding a reception signal using a low density parity check code in a mobile communication system that transmits a signal through a plurality of transmission antennas by space-time coding the signal, the apparatus comprising:

a memory for storing a lifting low density parity check matrix for forming the lifting low density parity check matrix by expanding values of elements in the low density parity check matrix to a sub-matrix corresponding to a number of the transmission antennas; and a lifting low density cheek decoder for decoding the reception signal using the lifting low density parity cheek matrix stored in the memory, wherein, if the values of the elements in the low density check matrix are "1", each of the values of the elements is expanded to a matrix selected from permutation matrices formed by exchanging rows of an identity matrix, and wherein at least one of the elements having values of "1" in a row of the low density parity check matrix is expanded to a sub-matrix including a 2×2 identity matrix.

19. The apparatus as claimed in claim 18, further comprising a hard decision unit for providing a reception symbol through a hard decision of a signal decoded through the lifting low density parity check decoder.

20. The apparatus as claimed in claim 18, further comprising a lifting controller for controlling the lifting low density parity check decoder according to information related to the number of the plurality of transmission antennas.

21. The apparatus as claimed in claim 18, further comprising a detector for detecting signals received through reception antennas by classifying the signals into several groups according to the plurality of transmission antennas.

22. The apparatus as claimed in claim 21, further comprising a plurality of de-interleavers for de-interleaving signals, which are classified into several groups according to the plurality of transmission antennas by means of the detector, through a de-interleaving scheme identical to an interleaving scheme of an encoder.

23. The apparatus as claimed in claim 18, wherein the lifting low density parity check decoder comprises:
- a first variable node decoder for performing a low density parity variable node decoding with regard to the reception signal according to the lifting low density parity matrix;
- a check node decoder interleaving an output signal of the first variable node decoder in order to perform a low density parity check node decoding with regard to the output signal; and
- a second variable node decoder interleaving an output signal of the check node decoder in order to perform the low density parity variable node decoding with regard to the output signal of the check node decoder.

24. The apparatus as claimed in claim 23, wherein the lifting low density parity check decoder comprises an interleaver controller for controlling the interleaving and de-interleaving according to the number of the plurality of transmission antennas.

25. The apparatus as claimed in claim 23, wherein an output signal of the second variable node decoder is serial/parallel converted and interleaved, and the converted and interleaved output signal is detected by the detector in order to perform an iterative decoding.

26. The apparatus as claimed in claim 25, wherein the output signal of the first variable node decoder is determined as a final decoding signal when the iterative decoding is repeatedly performed for a predetermined number of times.

27. The apparatus as claimed in claim 26, further comprising a hard decision unit for providing a reception symbol through a hard decision of a signal decoded through the first variable node decoder.

28. The apparatus as claimed in claim 18, wherein when the number of the plurality of transmission antennas is $N_T$, the sub-matrix has a size of $N_T \times N_T$.

29. The apparatus as claimed in claim 18, wherein the lifting low density parity check matrix expanded to the sub-matrix includes the low density parity check matrix.

30. The apparatus as claimed in claim 18, wherein, if the values of the elements in the low density cheek matrix are "0", each of the values of the elements is expanded to a "0"-matrix.

* * * * *